(12) United States Patent
Schmidt

(10) Patent No.: US 7,501,049 B2
(45) Date of Patent: Mar. 10, 2009

(54) ECM-MACHINE

(75) Inventor: Georg Schmidt, Schwabach (DE)

(73) Assignee: Leistritz Aktiengesellschaft, Nuremberg (DE)

( * ) Notice: Subject to any disclaimer, the term of this patent is extended or adjusted under 35 U.S.C. 154(b) by 778 days.

(21) Appl. No.: 11/206,940

(22) Filed: Aug. 17, 2005

(65) Prior Publication Data

US 2006/0042931 A1    Mar. 2, 2006

(30) Foreign Application Priority Data

Aug. 21, 2004  (DE) ................... 10 2004 040 578

(51) Int. Cl.
  *C25D 17/00*  (2006.01)
(52) U.S. Cl. ............... 204/224 M; 204/224 R; 204/199; 204/225
(58) Field of Classification Search ............ 204/224 R, 204/224 M, 199, 225; 205/652, 654
  See application file for complete search history.

(56) References Cited

U.S. PATENT DOCUMENTS 4,851,090 A    7/1989 Burns et al.
5,244,548 A *  9/1993 Bruns et al. ................. 428/598
7,204,926 B2 * 4/2007 Lamphere et al. ........... 205/652

FOREIGN PATENT DOCUMENTS

EP        0 292 213       11/1988

\* cited by examiner

*Primary Examiner*—Nam X Nguyen
*Assistant Examiner*—Luan V Van
(74) *Attorney, Agent, or Firm*—Jordan and Hamburg LLP

(57) ABSTRACT

ECM machine for electrochemically machining metallic workpieces by anodic dissolution of the workpiece by means of an electrolyte and an applied dc voltage, comprising at least one revolving table for mounting the workpiece or a workpiece carrier, as well as a portal with a transverse girder, at which one or two cathodes are provided, the at least one revolving table being rotatable about a vertical axis and being movable along horizontal guides linearly with respect to the revolving table. The transverse girder is movable vertically at vertical guides of the portal, transverse girder being rotatable about a horizontal axis of rotation. The cathode or cathodes are clampable each at one or at a common clamping device at the transverse girder and/or movable linearly along the transverse girder at least at one horizontal guide.

12 Claims, 7 Drawing Sheets

ECM-MACHINE

BACKGROUND OF THE INVENTION

The invention relates to an ECM machine for electrochemically machining metallic workpieces by anodic dissolution of the workpiece by means of an electrolyte and an applied dc voltage.

The principle of ECM machining (ECM=Electro Chemical Machining) is based on the fact that a direct current is applied between a mold and the workpiece, which is to be machined. This direct current is sufficient to bring about a uniform, anodic dissolution of the workpiece in a region in the vicinity of the latter. In the gap between the workpiece and the mold (cathode) a suitable electrolyte solution flows continuously at a high rate. A copying of the contour of the mold is achieved by moving the workpiece forwards in a controlled manner. The ECM method works without the action of a mechanical force between the workpiece and the mold, which is not subjected to any wear. A very high copying accuracy and repetition accuracy is achieved and it is possible to produce complicated spatial shapes. For this reason, ECM is a particularly advantageous method for machining materials with a high heat resistance, which, because it is difficult to machine and work them with other methods, are subjected to limits. One application example is the machining of integrally bladed rotors for flow machines, which frequently are also called blisks. Here the blades, roughly worked by suitable methods, are finished using an ECM machine and appropriately molded mold cathodes. The blades are wound in themselves and, in a threading motion, which depends on the shape of the blades, must be moved into the spaces between the blades.

An ECM machine, suitable for this purpose, is known from the EP 0 292 213 B2. For this machine, two revolving tables are used, which are orthogonal to one another and the axes of rotation of which extend horizontally and are orthogonal to one another. At one revolving table, there are the mold cathodes, which can be rotated by the revolving table about the axis of the table and can be moved independently and linearly with respect to one another. At the other revolving table, at the end of a rotating shaft, there is a mold mount, at which the rotor, which is to be machined, is disposed. Because of the arrangement of the axes of rotation of the tables relative to one another, the blades, with their free end faces in the machining position, are perpendicular to the revolving table carrying the cathodes. This means that the longitudinal axis of the blades is aligned with the axis of rotation of the cathode revolving table. The shaft, carrying the rotor, furthermore can be moved linearly along a linear axis, extending parallel to the axis of rotation of the cathode revolving table, to the cathode revolving table.

For various reasons, such a machine has limitations. On the one hand, because of the configuration selected, the movability of the cathodes and of the workpiece with respect to one another is limited. On the other, because of the structure selected, with the two revolving tables and the freely bearing shaft carrying the rotor, there is only a limited static and dynamic stiffness of the system, resulting in a reduced working accuracy. Due to process forces and thermal expansion, there may be deformations, which, even if they are slight, result in shape defects in the workpiece. The machining possibilities are limited by the size and geometry of the parts.

SUMMARY OF THE INVENTION

It is therefore an object of the invention to indicate an ECM machine, which permits flexible machining even of different workpieces of different geometry with, at the same time, a high machining accuracy.

Pursuant to the invention, this objective is accomplished by an ECM machine, comprising a revolving table for accommodating the workpiece or a workpiece carrier, as well as a portal with a transverse girder, at which one or two cathodes are provided, the revolving table being rotatable about a vertical axis of rotation, the portal being linearly movable with respect to the revolving table at horizontal guides, the transverse girder being vertically movable at vertical guides of the portal the transverse girder being rotatable about a horizontal axis of rotation and the cathode or the two cathodes being such that they can be clamped to one or a common clamping device at the transverse girder and/or shifted linearly at the transverse girder on at least one horizontal guide.

The inventive ECM machine is distinguished by the use of a portal, at which a transverse girder is disposed vertically movably and, in turn, carries the cathodes. A symmetrical construction is realized. The vertical guidance of the horizontal girder leads to maximum stiffness and, at the same time, minimizes thermal effects. At the same time, long traveling paths can be achieved. Because of the different axes and mobilities, which have been provided, it is also possible to machine workpieces with complicated spatial shapes. As described, the workpiece itself is disposed at a revolving table, which can be rotated about a vertical axis. The portal can be shifted horizontally with respect to table and, with that, with respect to the workpiece. The cathodes themselves can also be moved vertically with respect to the workpiece. The portal can be moved horizontally with respect to the table and, with that, with respect to the workpiece. The cathodes themselves can also be moved vertically with respect to the workpiece and can be rotated into any angular position because of the rotatable arrangement of the transverse girder about a horizontal axis. One or two further movement axes may furthermore be realized owing to the fact that the two cathodes can be moved jointly at a common horizontal guide or that each cathode can be shifted separately at a horizontal guide at the transverse girder. Alternatively, in the case of simpler objects, it is also conceivable to provide, instead of the cathode guides at the transverse girder, only one clamping device for a mold, namely when a horizontal movement in this area is not required. Alternatively, it is, of course, also conceivable to dispose the clamping device itself horizontally movably at the transverse girder.

On the whole, because of the relative mobility of the individual elements with respect to one another, the inventive ECM machine offers a high degree of flexibility with respect to the mobility of the parts and permits parts of different geometry (cylindrical, prismatic, polygonal, panel-shaped or disk-shaped, etc.), to be machined. Moreover, because of the construction of the portal, maximum stiffness and, with that, extremely high accuracy are ensured. Advantageously, the accuracy and positioning problems, resulting from the "open" construction of the aforementioned state of the art, do not arise in the case of the inventive machine. A further advantage is the good accessibility to the working area, since, because of the horizontal mobility of the whole portal, at which the working components are provided, the revolving table and, with that, the workpiece mount are easily accessible. This means that, because of the long portal traveling path that can be realized, the workpiece is a readily accessible. The corresponding applies also for the workpiece cathodes, which, with appropriate positioning of the portal remote from the revolving table, are also readily accessible, so that an exchange is possible very easily here as well as at the revolving table.

In order to realize a further degree of freedom of movement, an advantageous further development of the invention provides a workpiece carrier, which can be fastened detachably at the revolving table, comprising a horizontal axis of rotation, about which the held workpiece can be rotated. This embodiment is appropriate especially for machining bladed rotors, since the rotor can be turned stepwise over the horizontal axis of rotation, which is realized at the workpiece carrier, and a new blade can be realized in the working region of the cathodes, which, because of the realized mobility, can be realized at any lateral position or at a position there above. Other objects, such as, for example, rotationally symmetrical housings for aircraft engines or prismatic parts or rings or disks can be fastened directly to the revolving table.

In the event that a workpiece carrier with an integrated, horizontal axis of rotation is provided, an advantageous further development of the invention provides for configuring said workpiece carrier so that the workpiece can be displaced linearly along the horizontal axis of rotation. This configuration makes it possible to clamp and machine rotors with several rows of blades, so-called multiple blisks. Because of the linear displaceability, it is possible to position the vertical axis of each of the blade rows, which are to be processed and are aligned with the axis of rotation of the table, in order to be able to load the cathodes, for which purpose, because of the fact that the blade shape is wound in itself, the revolving table must be rotated somewhat during the loading motion. With this configuration of the invention, the spectrum of work can be enlarged even further.

The horizontal guides, at which the portal is guided, advisably are provided at a machine bed of the machine, at which the revolving table is also mounted rotatably. This means that the machine is distinguished by an appropriately dimensioned machine bed, on which, on the one hand, the revolving table is mounted, and which, on the other, also has the horizontal guides, which may be spaced adequately far apart from one another, so that also large parts can be clamped and the portal can travel over them.

In view of an extremely stable guidance for achieving maximum stiffness, it is particularly advantageous if the vertical guides for the transverse girder are realized by means of, in each case, two lateral vertical columns, between which, in each case, a carriage carrying the transverse girder is guided. Pursuant to the invention, therefore, a double gantry construction is provided, for which the portal advisably is realized from two lateral portal elements, which have a closed structure or form a frame and are connected with one another over a separate stabilizing carriers.

Because of the mounting of the transverse girder carriage, which is provided pursuant to the invention, it is possible to mount the transverse girder at the carriage in pivot bearings, which form the horizontal axis of rotation of the transverse girder. In this region, maximum stability is ensured because of the double-sided guidance of the carriage, so that the horizontal axis of the transverse girder can be realized directly in this region without any effect on the stability or the accuracy of the positioning.

In the case of the ECM machine, known from the state of the art given above, a further problem is seen to lie in the guidance of the various pipelines and leads, which supply the electrolyte or provide the operating voltage or the driving and controlling signals to the individual driving mechanisms. Especially the electrolyte-supplying and electrolyte-discharging pipelines pass directly through the working space to the working area. Since the pipelines are permanently placed, they also interfere with the accessibility to the cathodes and the workpiece. In order to provide a remedy here, one or more of the pipelines and leads of the inventive EMC machine for supplying electrolyte and for supplying power to the cathodes and/or to one or more driving mechanism leads or control leads for linear driving mechanisms of the cathodes, passed over the carriages at the transverse girders are passed through or along the transverse girder. As a result of the portal construction, it is now possible to "hide" the leads and pipelines in question, so that, during the work, they do not extend into the working space and, when the portal is moved to the side, are not in the way in an obstructing manner at any place. After all, running the leads and pipelines through the portal, advisably over the vertical carriers of the portal into the transverse girder, enables the leads and pipelines to be carried along when the portal is moved. For the compactness of the construction, it is, of course, advisable to "hide" as many pipelines and leads as possible in the portal.

Advisably, the electrolyte cycle should be closed in order to avoid the unimpeded exit of the electrolyte. For this purpose, different configurations are possible, depending on the workpiece, which is to be machined. For example, if a workpiece carrier, which is to be disposed at the revolving table, is used within the scope of blisk machining, the workpiece advisably should be disposed in a two-part electrolyte chamber, the electrolyte being recycled over a discharging opening in the bottom through the revolving table. By way of an appropriate sealing opening, the cathodes grip through the upper part of the electrolyte chamber in the working region. The electrolyte is passed preferably over the cathodes into the working region. The electrolyte is passed preferably over the cathodes into the working region. By these means, a closed, tight cycle can be realized. In the event that such a pot-like workpiece carrier is not used, for example, when housing parts of larger surface area or the like are machined, it is advisable to provide a sealing cover, which surrounds the cathodes and, during the machining, lies in contact with the workpiece forming a seal and has suitable supplying and a discharging openings for the electrolyte. For this configuration of the invention, the cathodes are surrounded by an appropriate, sealing cover. For the machining, the cathodes approach the workpiece and the sealing cover lies in contact with the workpiece, forming a seal. Here also, the electrolyte is supplied over the cathodes into the then sealed space, from which the electrolyte can be withdrawn over appropriate discharging pipelines, which, for example, are also supplied from the direction of the transverse carrier or run into the latter. By these means also, a tight closed cycle can be realized.

In a particularly appropriate configuration of the invention, the workpiece is held mechanically and contacted electrically by way of hydraulically or pneumatically controlled clamping means. For this configuration of the invention, an automatically operating clamping mechanism is therefore used, which makes reproducible clamping with always the same clamping force possible. By these means, a reproducible electrical contact can also be achieved. The machine can be changed over rapidly and simply, since the clamping system always remains the same. Only the mounting installation directly engaging the part may have to be exchanged to correspond to the new part, which has to be clamped, for example, when a larger rotor or a larger housing has to be clamped. Depending on the configuration, the clamping means may be provided at the workpiece carrier or at the revolving table. The latter arrangement may be used for clamping the workpiece, which is to be machined, as well as, optionally, the workpiece carrier with the actual, integrated clamping means. Clamping means, integrated into the workpiece carrier, can be moved, for example, along the axis of rotation for clamping the workpiece. For moving multiple blisks, the clamping means itself can be shifted longitudinally, for example, by way of an internal fastening or the like. At the revolving table, the clamping means may be configured, for example, as an internal or external clamping mechanism for hollow objects or disks and rings, etc.

Even though they are not described in greater detail, measurement sensors for accurately determining the path of the rotational or longitudinal driving mechanisms, the movement of which is numerically controlled and which can be triggered separately, are of course provided at the machine and placed or integrated at the appropriate site. Signal leads are also always placed so that they do not ever interfere either during the actual machining operation or within the scope of other movements.

Further advantages, distinguishing features and details of the invention arise out of the examples, which are described in the following, as well as from the drawings.

DESCRIPTION OF THE PREFERRED EMBODIMENTS

Figure 1:
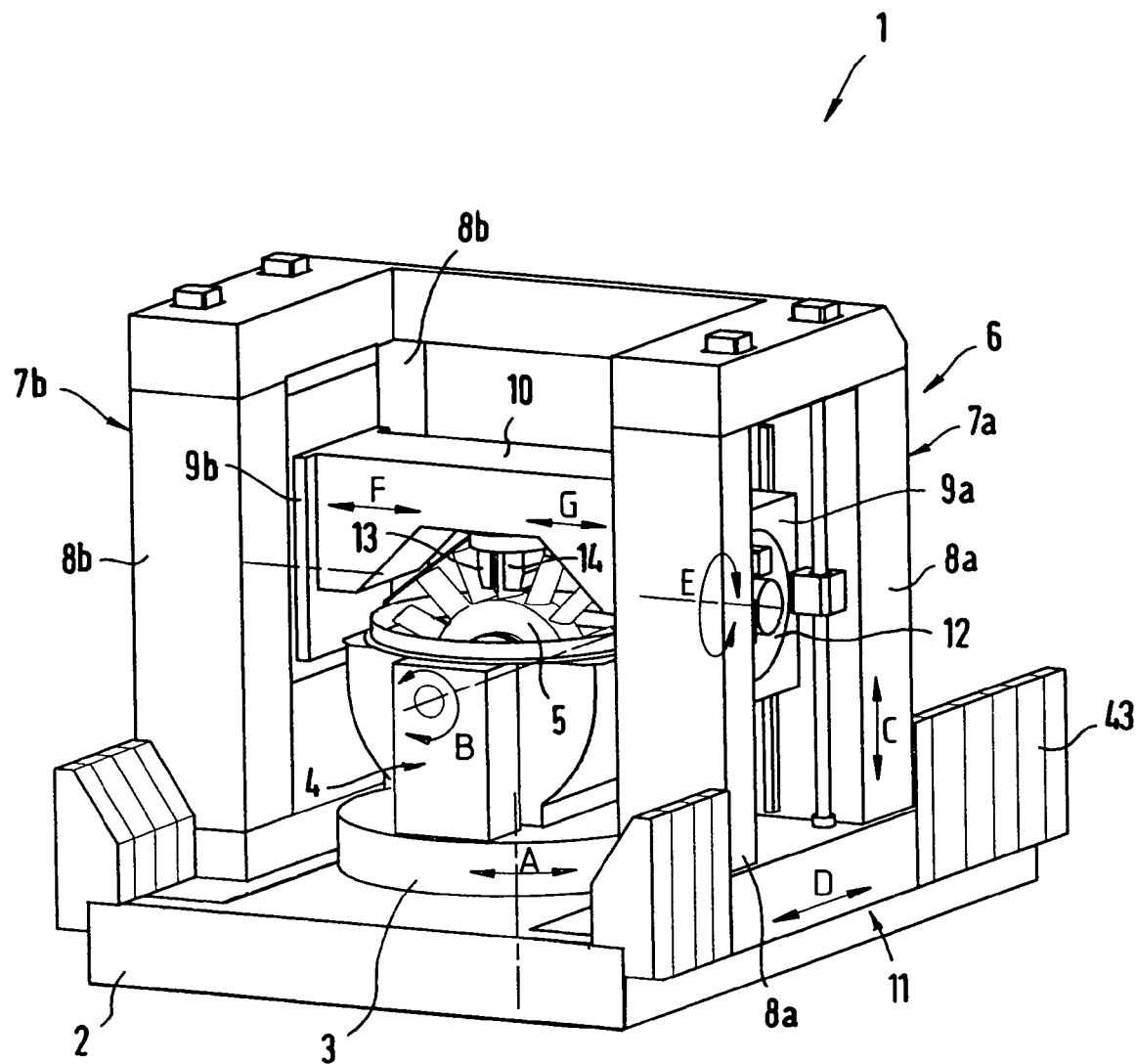
FIG. 1 shows a diagrammatic representation of a perspective view of an inventive ECM machine of a first embodiment.

FIG. 1 shows an inventive ECM machine 1 with a machine bed 2 and a revolving table 3, on which the workpiece or workpiece carrier is mounted. The revolving table 3 can be rotated about a vertical axis A, as indicated by the double arrow A.

A fork-shaped workpiece carrier 4, which can be rotated by the revolving table 3, is fastened to the revolving table 3. A clamping device, which will be dealt with in the following and with which the workpiece, which in this case is a bladed rotor 5, can be clamped, is integrated at the workpiece carrier 4. The clamping device enables the clamped workpiece to be rotated about a horizontal axis of rotation B, as indicated by the double arrow B.

Furthermore, a portal 6 is shown, which consists of a right portal section 7a and a left portal section 7b. Each portal section 7a, 7b has two vertical columns 8a and 8b, which are connected at the top and bottom with girders to form a closed frame. The columns form the guides for in each case one carriage 9a, b, to which a transverse girder 10 is fastened. Each carriage 9a, b is guided by suitable longitudinal driving mechanisms and vertical guides directly at the inner side of each vertical column 8a and 8b. Bilateral mounting as well as a bilateral driving mechanism are thus realized and will be dealt with in the following. Because of this guidance, the transverse girder 10 can be moved in the vertical direction along the vertical linear axis C, as indicated by double arrow C. As indicated by a double arrow D, the portal 6 itself can be moved along the horizontal linear axis at horizontal guides 11, which are constructed in the direction of the machine bed 2. The portal can be shifted with respect to the workpiece.

The transverse beam 10 can be moved, not only, as indicated by the double arrow C, but can also be rotated about a horizontal axis of rotation E, as indicated by the double arrow E. For this purpose, the transverse girder 10 is accommodated, rotationally movably, over appropriate pivot bearings 12 at the respective carriage 9a, b. By these means, the transverse girder 10 can also be shifted about the horizontal axis E.

In the case of the inventive configuration shown in FIG. 1, two mold cathodes 13, 14, each of which is disposed at a corresponding, horizontally movable carriage or at a different type of movement unit, are provided at the transverse girder 10. Because of this horizontally movable mounting, it is possible to move each cathode 13, 14 separately horizontally in order to position it with respect to the workpiece, as indicated by the two double arrows F and G, which characterized the linear axes.

The following linear or rotational mobilities are therefore realized for the inventive ECM machine 1:

| | |
|---|---|
| A: | vertical axis of rotation of the revolving table 3, |
| B: | horizontal axis of rotation of the workpiece carrier 4, |
| C: | vertical axis of linear motion of the transverse girder 10, |
| D: | horizontal axis of linear motion of the whole portal 6, |
| E: | horizontal axis of rotation of the transverse girder 10, |
| F: | horizontal axis of linear motion of the cathode 13 and |
| G: | horizontal axis of the linear motion of the cathode 14. |

Figure 2:
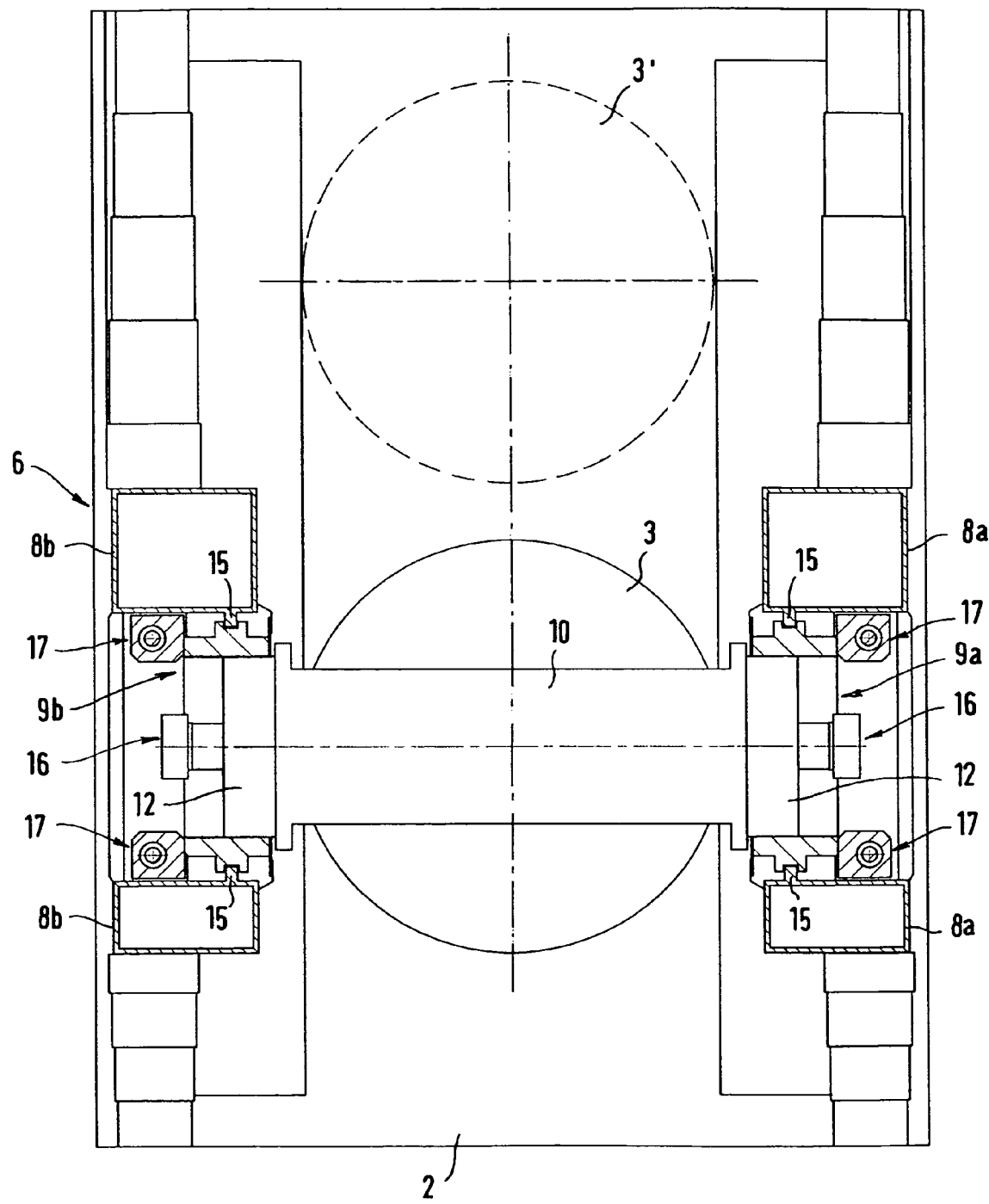
FIG. 2 shows a plan view of the machine of FIG. 1.

FIG. 2 shows a plan view of the ECM machine of FIG. 1 in the form of a partial sectional view. The section passes through the portal 6, which is constructed as a double gantry. The two carriages 9a, b, which can be moved at appropriately linear guides 15, are shown at the vertical columns 8a, 8b. For vertical movements, two vertical driving mechanisms 17, which are number-controlled driving mechanisms, are assigned to each carriage. Furthermore, the pivoted mounting 12 of the transverse girder 10 is shown. Electrolyte and power are supplied by means of bilateral rotating unions 16, through these pivoted mountings. This will still be dealt with in the following.

As can furthermore be inferred from FIG. 2, a second revolving table 3', which is indicated here only by broken lines, is provided as an option. A second revolving table 3' can readily be integrated if the machine bed 2 is sufficiently long, since the double portal 6 can be moved correspondingly far. By these means, great flexibility in working is possible, since the revolving table 3' can already be prepared while machining is still being carried out at revolving table 3.

Figure 3:
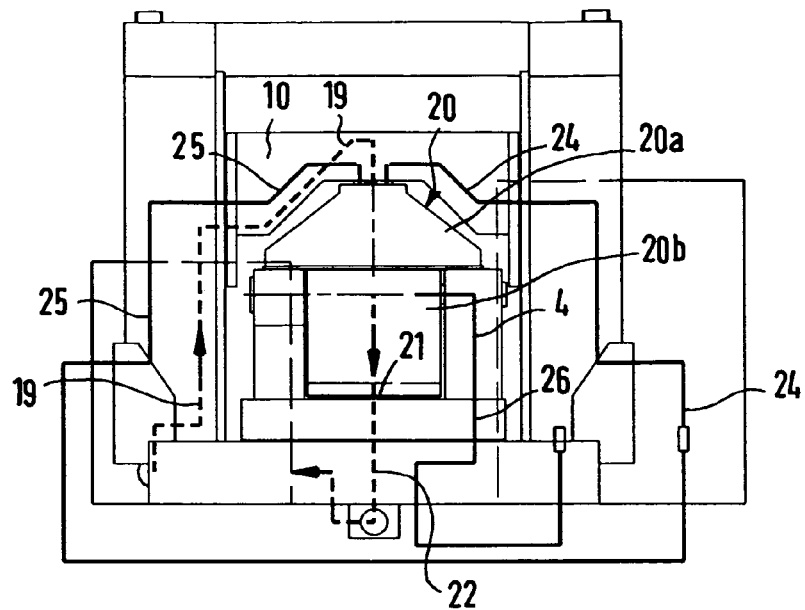
FIG. 3 shows a diagrammatic representation in the form of an elevation of an inventive ECM machine in order to show the electrolyte- and voltage-supplying cycles.
Figure 4:
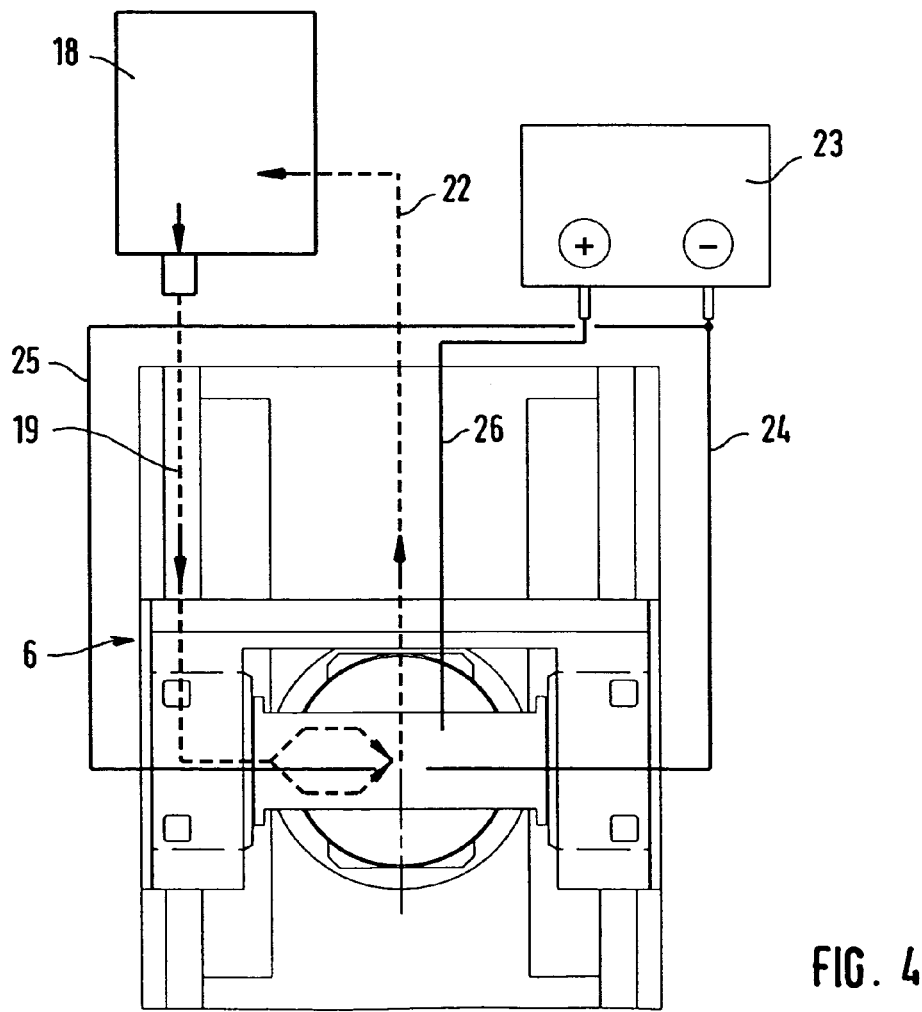
FIG. 4 shows a plan view of the representation given in FIG. 3.

FIGS. 3 and 4 shows the closed electrolytes cycle as well as the power supply to the workpiece and cathode or cathodes in the form of diagrammatic representations. The electrolyte supply comprises an electrolyte supplying and preparation unit 18. The electrolyte-supplying pipeline 19 is integrated in the machine bed and leads to the portal 6. The pipeline extends at or in one of the vertical columns to the rotating union 15, from which it is taken to the transverse girder 10, in which it extends to the cathodes, the details of which are not shown in FIG. 3. For this example, the cathodes grip through the upper part 20a of the two-part electrolyte chamber 20. The electrolyte supplied passes through the working region into the lower part 20b of the electrolyte chamber 20, from where it is passed over a discharging opening 21 and a recycling pipeline 22 back into the electrolyte supplying and preparation unit 18. The electrolyte supply is therefore integrated completely in the machine structure, that is, the pipeline is not exposed.

Power is supplied to the cathodes 13, 14 in a corresponding manner. Starting out from a power supply 23, there is, on the one hand, the electrical connecting lead 24, which is run, for example, to the cathode 13, as well as the electrical connecting lead 25, which is run, for example, to the cathode 14. Each connecting lead 24, 25 is taken at one portal section upward to the vertical girder 10, in which it extends over a rotating union 16 to the respective cathode. This means that these leads are also "hidden" and are carried along automatically whenever the portal is moved. In the example shown, a further lead 26 for contacting the workpiece (anode) extends in the machine bed to the revolving table 3 or to the workpiece carrier 4.

Figure 5:
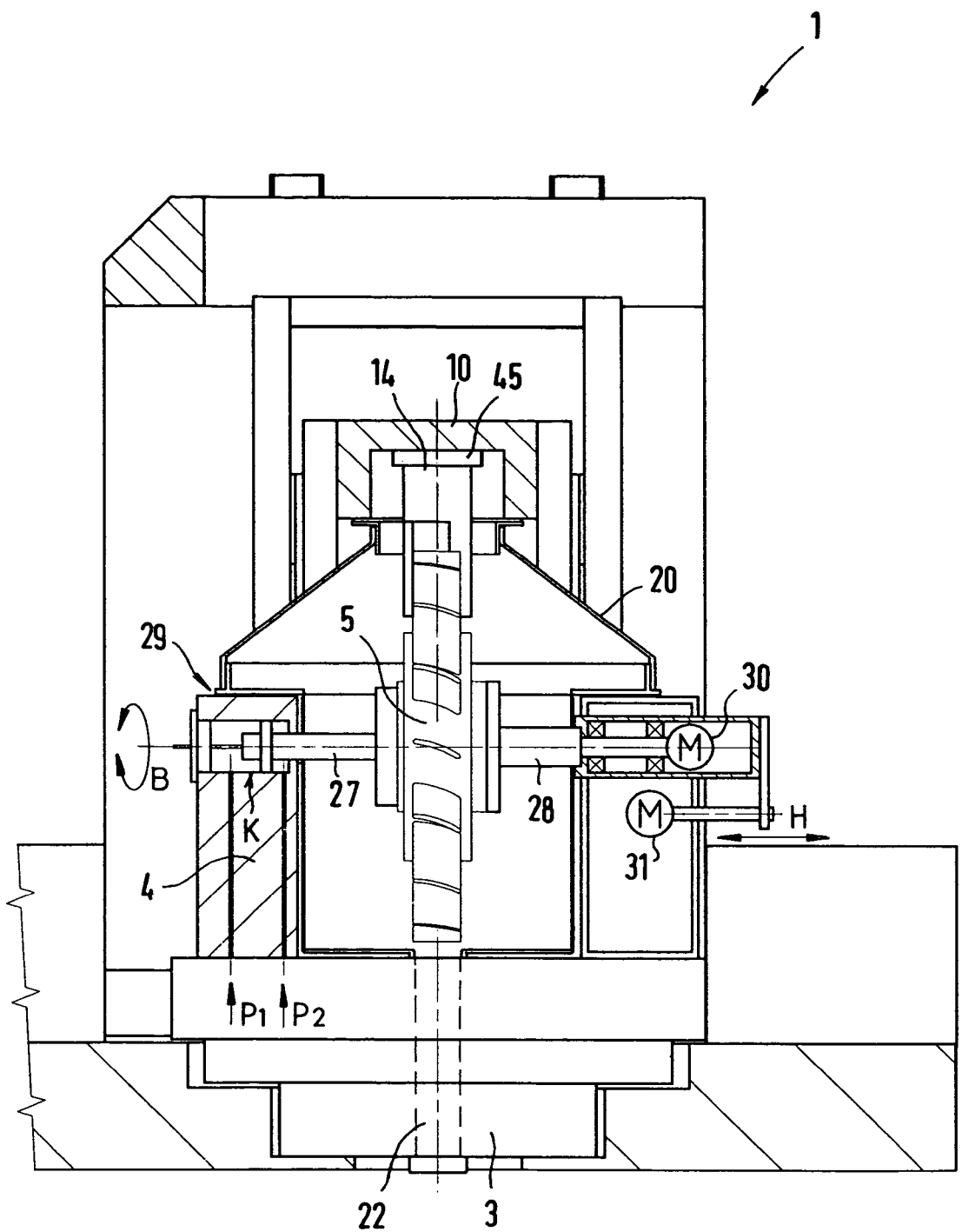
FIG. 5 shows a longitudinal section through an inventive ECM machine, in which a fork-shaped workpiece carrier with clamping mechanism is disposed.

FIG. 5 shows a section through the ECM machine 1 in the longitudinal direction. The workpiece carrier 4 is shown in section and is constructed fork-shaped and has a hydraulic clamping device 29, over which the workpiece, which is the rotor 5 here, is clamped. The clamping device 29 consists of a first pivotably mounted partial shaft 27, which can be moved in the direction of the axis of rotation B by a hydraulic displacement mechanism, and a second partial shaft 28. For a movement, hydraulic liquid is pumped into or discharged over the two supplying pipelines P1 and P2 from the respective piston space K, which is shown at the left at the partial shaft 27, depending on the direction, in which movement is desired. For clamping the rotor 5, the partial shaft 27 is pushed against the partial shaft 28, so that the clamping part at the partial shaft 27 is pressed against the rotor, so that the latter is mounted firmly. By these means, electrical contacting of the rotor is also established. This means that the electrical contact with the lead 26 is produced by way of the clamping device or the partial shafts 27 and 28. Furthermore, a driving motor 30 is shown, by means of which the arrangement can be rotated (axis of rotation B), as well as, furthermore, a driving motor 31, which ensures an optionally provided displacement movement of the whole clamping mimicry in the direction of the axis of rotation. This makes it possible to clamp a multiple blisk rotor as workpiece. As a result of the linear mobility, it is possible to position each blade row flush with the axis of rotation of the revolving table 3, in order to machine it then.

In FIG. 5, the transverse girder 10 is shown, at which the cathode 14 is disposed and at which it can be moved along the double arrow F in FIG. 1 over a guiding unit, to which it is fastened by a clamping device 45. Cathode 13, which is not shown in FIG. 5, is correspondingly mounted and is longitudinally movably. A numerically controlled driving motor, which brings about the respective rotational or linear movements and the details of which are not shown here, is provided for driving each cathode 13, 14 as well as for all possible movements.

Figure 6:
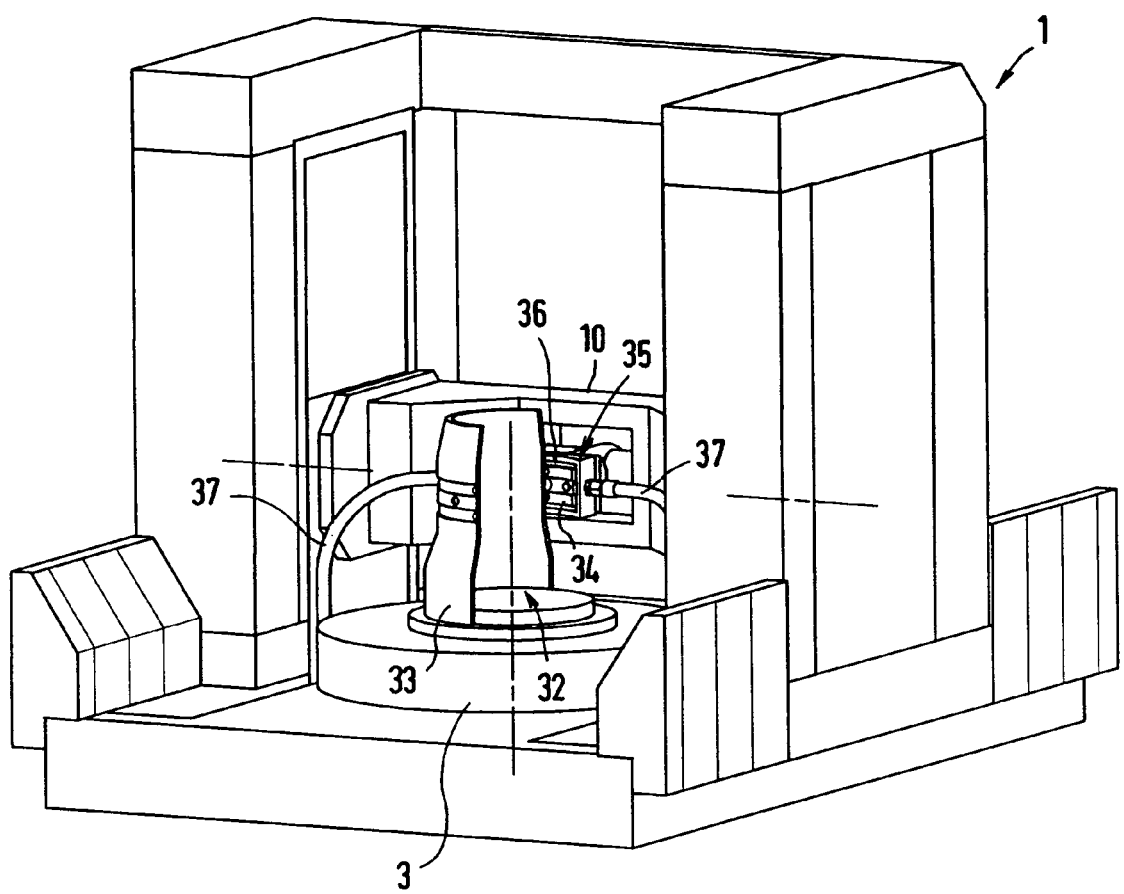
FIG. 6 shows a diagrammatic representation of a perspective view of a housing, which is to be machine.

FIG. 6 shows a modified embodiment of the inventive ECM machine 1. For this embodiment, a workpiece, in the form of a rotationally symmetrical housing part 33, is provided by way of example at the revolving table 3 at a clamping device 32, the details of which are not shown. In order to be able to machine the outer casing surface of the workpiece, the transverse girder 10 is moved here into a lowered position along the vertical guide C and swiveled about the horizontal axis of rotation E, so that it is essentially in a 90° lateral position with respect to the housing part 33.

In order to be able to machine the outside, only one cathode 34, which is surrounded by a sealing cover 35, is provided here. When the cathode 34 is in the operating position, this sealing cover 35 lies with its sealing surface 36 tightly against the outer wall of the housing, so that a sealed electrolyte space is formed, in which, as already indicated for the previously given embodiment, the electrolyte solution is supplied directly in the working area of the cathodes over the electrolyte pipeline 19 supplied in the transverse girder 10. For discharging, two drawing-off pipelines 37 are provided in the example shown. They communicate with the inner sealing device 35 and draw off the electrolyte occurring therein and pass it on to the electrolyte-supplying and electrolyte-preparing unit 8. These drawing-off pipelines 37 can also be taken along the transverse girder 10 and therefore also are "hidden".

The housing part 33 is held here also by a clamping device 32, over which electrical contacting over the revolving table 3 also takes place.

Figure 7:
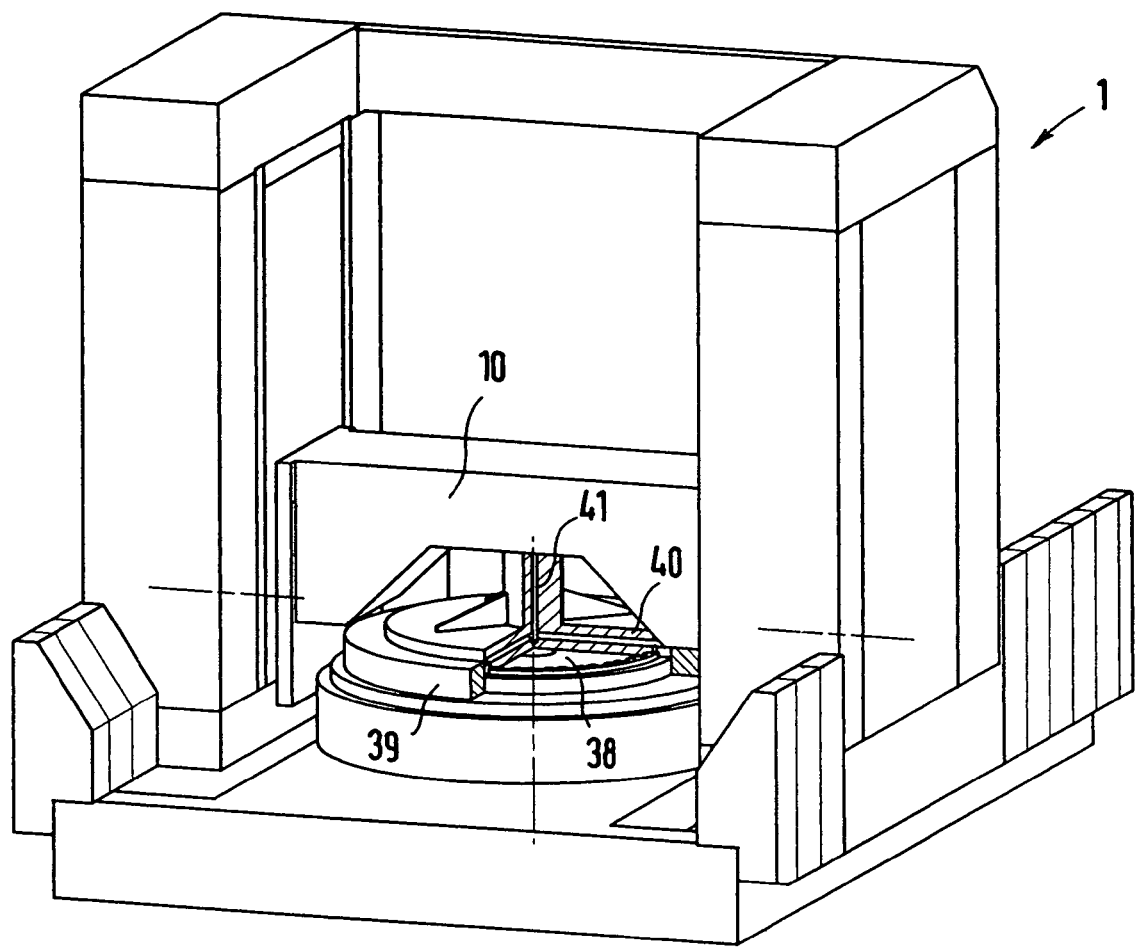
FIG. 7 shows a diagrammatic representation of a perspective view of a ring, which is to be machined.

FIG. 7 shows the inventive ECM machine 1. A workpiece in the form of a ring 38 is clamped here. For this purpose, an externally engaging clamping device 39 is used. Here also, the cathode 40 is supplied with electrolyte over the transverse girder and the electrolyte-supplying pipeline 41, which continues here through the cathode. For the machining, the transverse girder 10 is shifted here in the vertical direction along the C axis onto the workpiece.

Figure 8:
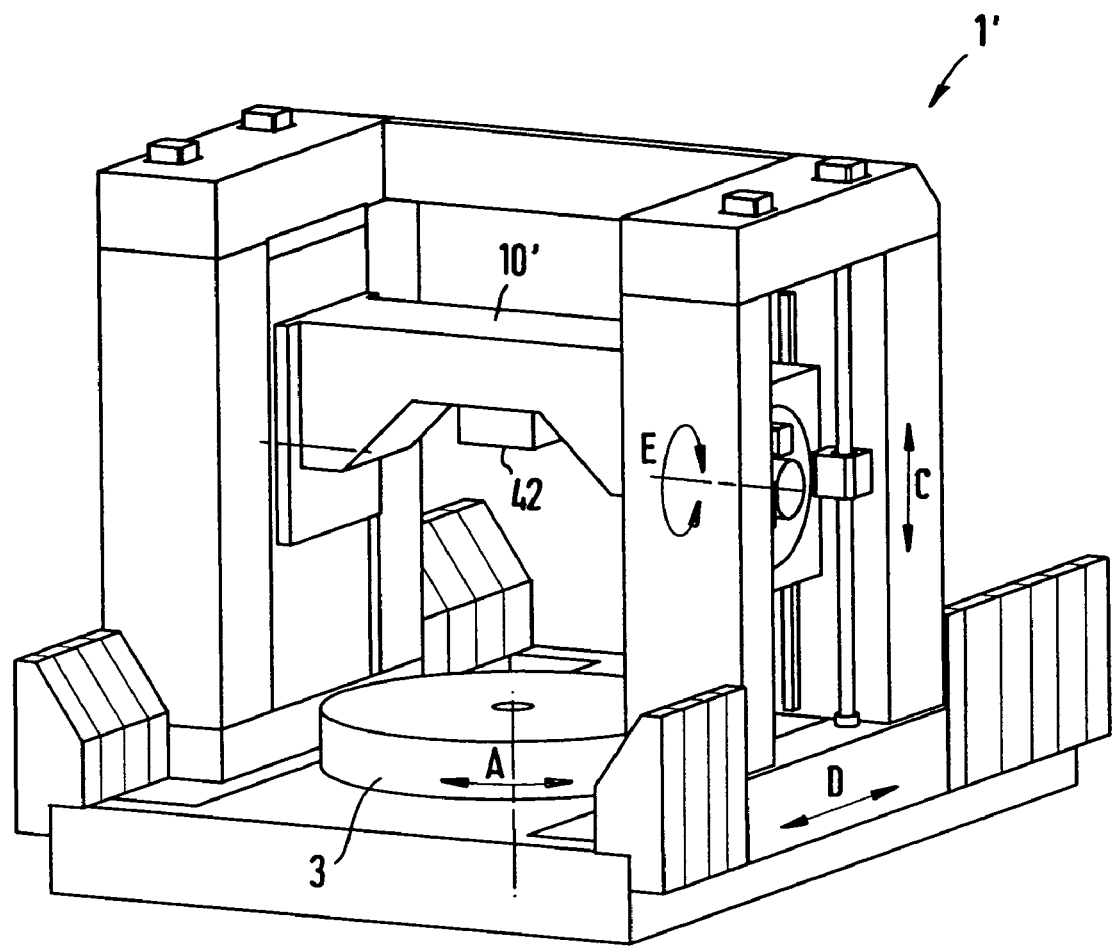
FIG. 8 shows a diagrammatic representation of a perspective view of an inventive ECM machine of a second embodiment.

Finally, FIG. 8 shows a further embodiment of an inventive ECM machine 1', for which the axes of rotation or the linear mobilities A, C, D and E are realized. Optionally, a workpiece carrier with the horizontal, rotational mobility B can be placed on the revolving table 3. However, the two linear mobilities F and G for the respective cathodes are not provided. In the case of this embodiment, a clamping device 42 for a cathode, the details of which are not shown and which is not mobile horizontally and, instead, can be shifted only vertically over the transverse girder 10' and optionally tilted, is provided at the transverse girder 10'. Such a configuration is suitable, for example, for machining the housing parts or rings shown in FIGS. 6 and 7.

Finally, it should be noted that the casing in FIGS. 1 and 8, for example, the external casing of the two portal sections 7a, 7b, is not shown completely. The coverings 43 of the horizontal guides 11, on which the portal 6 is moved, are also indicated only by way of example. They are constructed in telescoping fashion and cover the whole of the guiding area.

The invention claimed is:

1. ECM machine for electrochemically machining metallic workpieces by anodic dissolution of the workpiece by utilizing an electrolyte and an applied dc voltage, comprising
at least one revolving table for mounting the workpiece or a workpiece carrier, a portal with a transverse girder, at which one or two cathodes are provided,
the at least one revolving table being rotatable about a vertical axis (A), the portal being movable linearly along a horizontal axis (D) of horizontal guides with respect to the revolving table, the transverse girder being movable vertically along a vertical axis (C) of vertical guides of the portal, the transverse girder being rotatable about a horizontal axis of rotation (E), and the cathode or cathodes being clampable each with one or with a common clamping device of the transverse girder, and movable along a horizontal axis (F,G) of a horizontal guide of the transverse girder.

2. The ECM machine of claim 1, comprising a workpiece carrier, which can be fastened detachably at the revolving table, said workpiece carrier having a horizontal axis of rotation (B), about which the workpiece can be rotated.

3. The ECM machine of claim 2, wherein the workpiece can be shifted linearly along the horizontal axis of rotation (B).

4. The ECM machine of claim 1, wherein the horizontal guides, at which the portal is guided, are provided at a machine bed of the machine, at which the revolving table is also mounted rotatably.

5. The ECM machine of claim 1, wherein the vertical guides for the transverse girders are realized by means of two lateral, vertical columns, between which a carriage, carrying the transverse girder, is guided.

6. The ECM machine of claim 5, wherein the transverse girder is mounted at the carriage in pivot bearings, which form the horizontal axis of rotation (E).

7. The ECM machine of claim 1, wherein one or more pipelines for supplying electrolyte and/or one or more leads for supplying power to the cathodes and to one or more driving mechanism leads or control leads for longitudinal driving mechanisms of the cathodes, optionally carried at the transverse girder, are passed through or along the transverse girder.

8. The ECM machine of claim 1, wherein a closed electrolyte cycle is provided.

9. The ECM machine of claim 8, wherein the workpiece carrier is a fork-shaped workpiece carrier which can be mounted at the revolving table and has an electrolyte chamber through which the cathode or cathodes can reach, the electrolyte being withdrawn over a discharging opening at the revolving table.

10. The ECM machine of claim 8, wherein a sealing cover, surrounding a cathode, is provided which, during the machining, lies in contact with the workpiece forming a seal and from which the electrolyte, resulting therein, can be withdrawn over at least one discharging pipeline.

11. The ECM machine of claim 1, wherein the workpiece can be held mechanically and make electrical contact over a clamping device, which is controlled hydraulically or pneumatically.

12. The ECM machine of claim 11, wherein the clamping device is provided at the fork-shaped workpiece carrier or directly at the revolving table.

* * * * *